United States Patent [19]

Yokoyama et al.

[11] Patent Number: 4,665,736

[45] Date of Patent: May 19, 1987

[54] STIRRING DEVICE FOR AUTOMATICALLY MEASURING DISSOLVED OXYGEN

[75] Inventors: Tadashi Yokoyama, Tokyo; Toshio Kaizuka, Chiba; Junichi Naito; Kenichi Numazawa, both of Saitama; Minoru Ohashi; Tomoo Kikuchi, both of Tokyo, all of Japan

[73] Assignee: Oriental Yeast Co., Ltd, Japan

[21] Appl. No.: 865,553

[22] Filed: May 20, 1986

[30] Foreign Application Priority Data

May 27, 1985 [JP] Japan .............................. 60-77654[U]

[51] Int. Cl.$^4$ .............................................. G01N 27/00

[52] U.S. Cl. ......................................... 73/19; 366/273; 204/400

[58] Field of Search ............... 204/1 P, 373, 400, 415; 73/19, 61 R; 366/273, 274

[56] References Cited

U.S. PATENT DOCUMENTS

| | | | |
|---|---|---|---|
| 3,935,079 | 1/1976 | Fitterer et al. | 73/19 |
| 4,266,950 | 5/1981 | Makino et al. | 366/273 |
| 4,579,631 | 4/1986 | Ishikawa et al. | 204/415 |

*Primary Examiner*—Stewart J. Levy
*Assistant Examiner*—Hezron E. Williams
*Attorney, Agent, or Firm*—McGlew and Tuttle

[57] ABSTRACT

A rotor having N and S poles is rotatively supported through bearings from the lower end of an electrode to be immersed in a water sample in which dissolved oxygen is measured. A rotor driving means is disposed adjacent to the rotor, the means generally comprising a magnet which is so constructed that the N and S poles thereof alternately approach the rotor. The rotor follows the rotation of the rotor driving means to rotate in and stir the water sample.

3 Claims, 5 Drawing Figures

STIRRING DEVICE FOR AUTOMATICALLY MEASURING DISSOLVED OXYGEN

BACKGROUND OF THE INVENTION

1. Field of the Invention

This invention relates to a stirring device for automatically measuring dissolved oxygen.

2. Description of the Prior Art

Dissolved oxygen automatic measuring instruments are used for continuously measuring the amount of dissolved oxygen in waste water in municipal water systems, industrial plants and sewage treatment facilities. Such measuring instruments are specified in JIS K0803, and consist of a detector portion and an indicator-recorder portion, comprising an electrode, an electrode holder, a transducer and an indicator. An electrode is immersed in a water sample in which dissolved oxygen is to be measured, but in the case of diaphragm type electrodes, the concentration of oxygen adjacent to the electrode diaphragm is reduced to indicate lower-than-actual values if the water sample is stagnant or if the flow speed thereof is low, so that the sampled water must be given a flow speed of 20 cm/sec or more in order to give an accurate reading. Bubbles, etc. separated from water before or during measurement may adhere to the electrode diaphragm, causing errors in measurement.

In order to obtain accurate and consistent measurement of dissolved oxygen in water, the flow velocity of water contacting the electrode diaphragm must be high and steady, e.g., about 20 cm/sec. Means for stirring the water around the bottom end of an electrode have been used heretofore. Stirring means of the prior art were disclosed in Japanese Utility Model Laid-open Nos. 130258/83 and 130260/83. The former has an electromagnet disposed below the sensing portion of a sensor (the bottom face of an electrode), the electromagnet being energized by an on-off control, and the water is stirred by a horn- or spiral-shaped blade intermittently reciprocated in the direction approximately perpendicular to the axis of the electrode, i.e., horizontally, by the electromagnet. The latter has a stirring body with a brush implanted thereon in place of the blade in the former which moves in the same way as the former.

In addition to the stirring means of the prior art described above, means such as shown in FIG. 5 are also used. In this figure an electrode 11 is inserted in a vessel containing a water sample W in which dissolved oxygen is to be measured and a stirrer 16 having N and S poles is disposed at the bottom of the vessel 12. Underneath the vessel 12 is disposed a rotatable magnet 15 having N and S poles, the stirrer body 16 being rotated by rotating the magnet 15.

In the stirring means of the prior art described above, since the stirrer body is reciprocated or rotated horizontally near the lower end of the electrode, the water movement is not sufficient to generate a fast and steady flow velocity of water contacting the diaphragm so that the output of the electrode is unstable, and bubbles adhering especially to the central portion of the electrode are not removed sufficiently. A motor and a rotor body may be installed on the electrode itself to stir the water, but this adds to the weight of the electrode and possibly causes bending in the long shaft connecting the motor at the top and the stirrer at the bottom of the electrode. Also in a method in which a stirrer bar is inserted in a BOD bin for measurement, a steady flow velocity cannot be obtained, resulting in the problem of inconsistent data.

BRIEF SUMMARY OF THE INVENTION

The object of this invention is to provide a stirring device for automatically measuring dissolved oxygen, which device overcomes the problems described above in the prior art and is almost free of failure, wherein, by generating a water flow parallel to a diaphragm at the bottom surface of an electrode of a dissolved oxygen automatic measuring instrument to maintain a fast and steady flow velocity of a water sample contacting the diaphragm, indicated values are constant, bubbles adhering to the electrode surface are completely removed, and the electrode can further be very easily attached and adjusted, the electrode being compact and light weight.

DETAILED DESCRIPTION OF THE INVENTION

Figure 1:
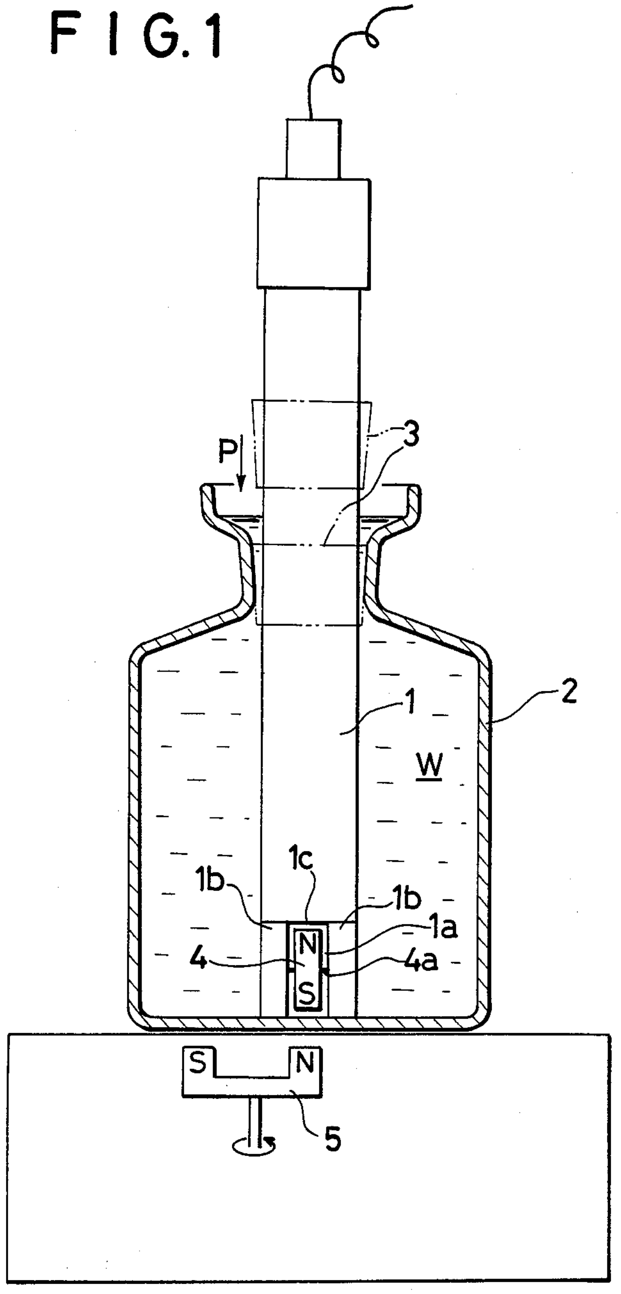
FIG. 1 is a vertical section of an embodiment of the invention.

The invention is a stirring device for automatically measuring dissolved oxygen, characterized in that it comprises an electrode, a rotor which is rotatively attached to one end of the electrode through a support and which has N and S poles and a rotating shaft perpendicular to the lengthwise direction of the electrode, and a rotor driving means which is disposed adjacent to the rotor and so constructed that the N and S poles of the means alternately approach the rotor.

The rotor is rotated about its rotating shaft by rotating a magnet disposed thereunder to generate in the water under the lower end of the electrode a flow parallel to the diaphragm at the bottom surface of the electrode. Bubbles adhering to the diaphragm of the bottom surface of the electrode are completely removed by the action of the flow.

The invention will now be described hereunder by way of examples with reference to the accompanying drawings.

An electrode 1 is inserted in and substantially vertical to a vessel 2 which contains a water sample W in which dissolved oxygen is to be measured. On the intermediate portion of the electrode 1 is slidably fitted a cork 3. When the electrode 1 is inserted in the vessel 2, the electrode 1 is secured to the vessel 2 by sliding the cork 3 into the vessel in the direction of arrow P. A groove 1*a* is defined by a pair of supporting members 1*b*, 1*b* at the lower end of the electrode 1, and a rotor 4 comprising a magnet having N and S poles is rotatively supported through journals in the groove. The shaft 4*a* of the rotor 4 is supported perpendicular to the lengthwise direction of the electrode 1. A U- or horseshoe-shaped magnet 5 is disposed exterior of the bottom surface of the vessel 2. The magnet 5 is rotated by a motor (not shown) and so constructed that the S and N poles thereof alternately are brought underneath the bottom of the rotor 4 by the rotation thereof. The supporting members 1*b* may be removably constructed.

In operation of the device, the vessel 2 is filled with the water sample W, the electrode 1 is then inserted in the vessel 2, the lower end of the electrode 1 being lowered to the bottom of the vessel 2, and the electrode 1 is secured to the vessel 2 by the cork 3. Next, when the magnet 5 is rotated, the N and S poles of the rotor 4 alternately attract and repel the N and S poles of the magnet 5, the rotor 4 being rotated about the shaft 4*a*. Water contacting the diaphragm at the lower end of the electrode is caused to flow substantially parallel to the diaphragm 1C to completely remove bubbles adhering to the diaphragm 1C.

Figure 2:
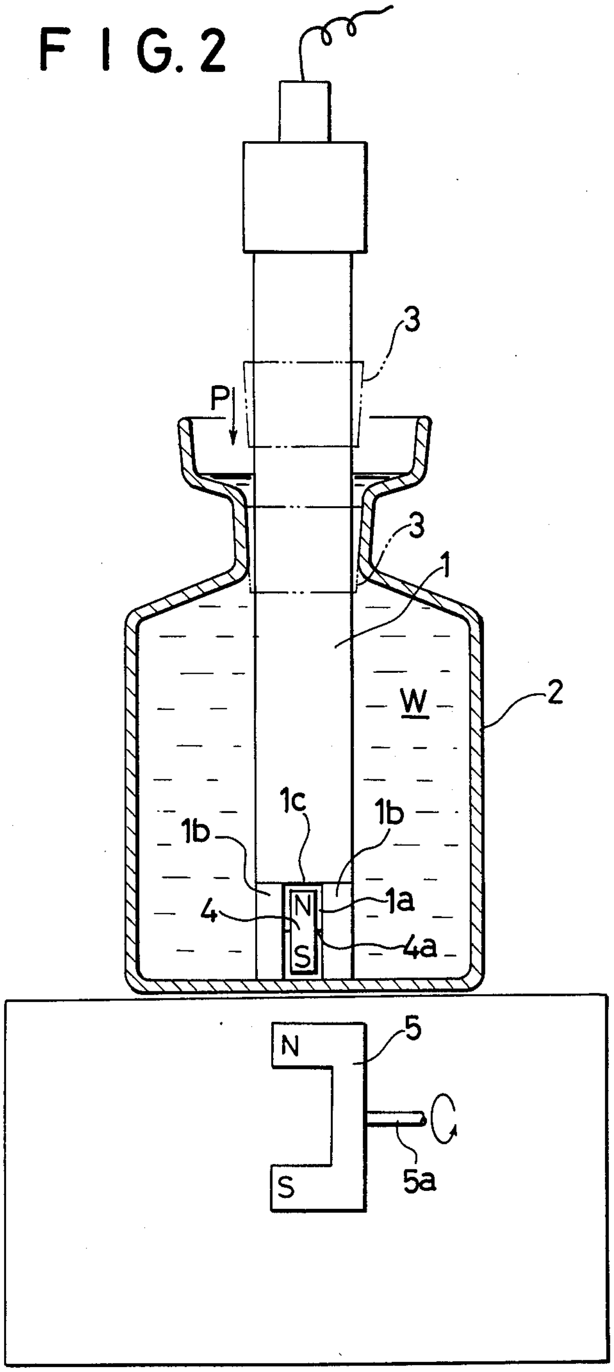
FIGS. 2 and 3 are sections of other embodiments of the invention.
Figure 3:
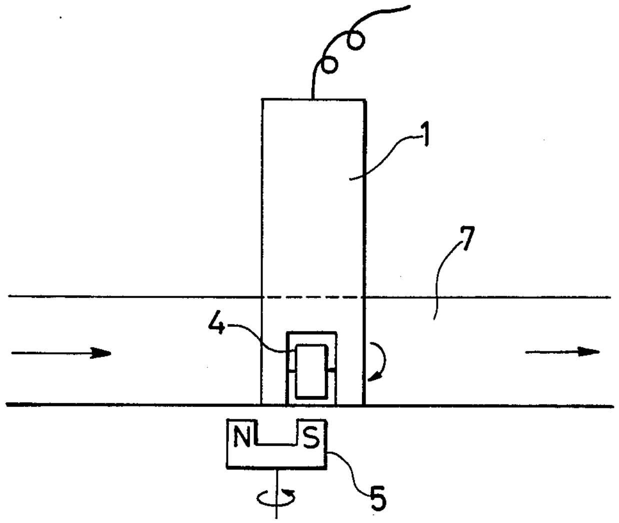

FIGS. 2 and 3 show other embodiments of the invention. A magnet 5 may be rotated about a horizontal shaft 5*a* to drive a rotor 4 to rotate as shown in FIG. 2. An electrode 1 equipped with a rotor 4 may be inserted in a water-flowing duct 7 and used for measurement by rotating the rotor 4 which is driven by a magnet 5 disposed outside the duct.

In place of the magnet 5, a stationary electromagnet may be used to rotate the rotor by alternately changing the S and N poles by converting the direction of electric current.

Figure 4:
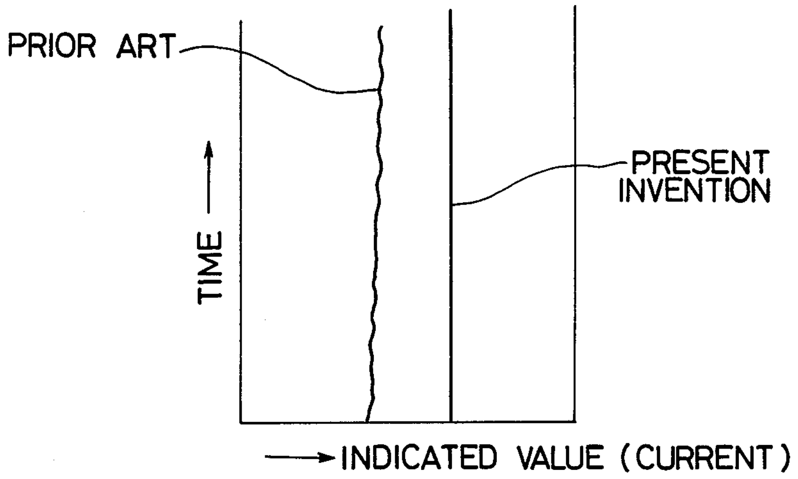
FIG. 4 is a graph showing variations in indicated values in the course of elapsed time.
Figure 5:
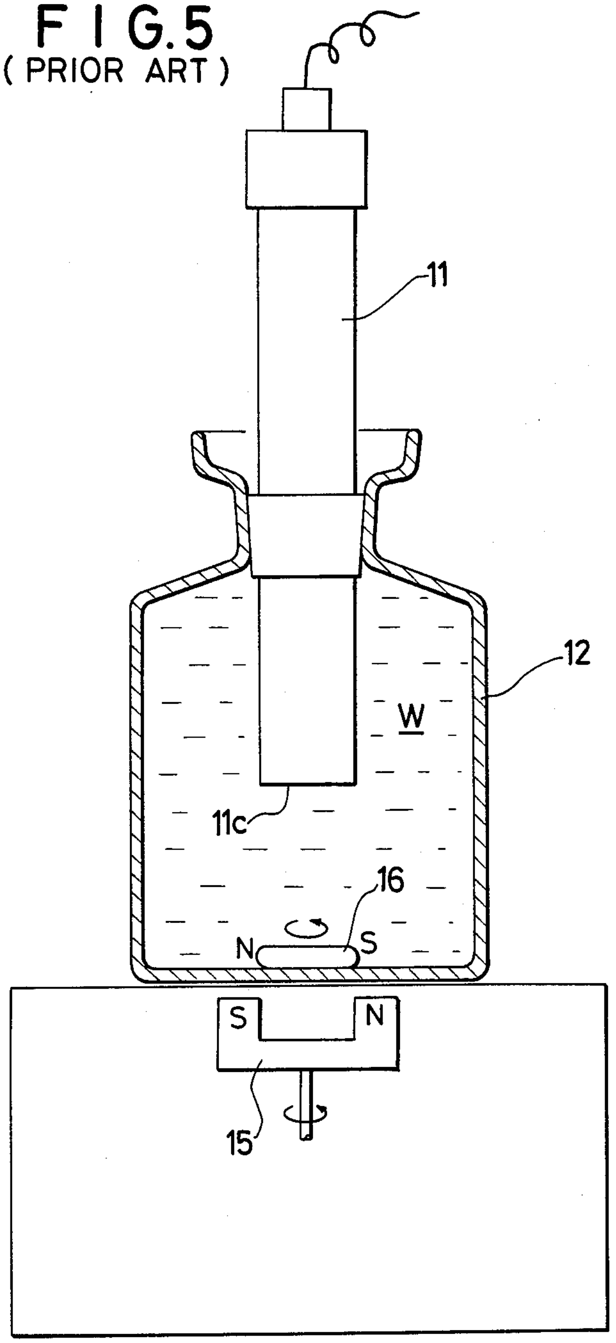
FIG.5 (PRIOR ART)
FIG. 5 is a section of an example of a prior art device.

FIG. 4 shows a comparison of variations of electrolytic reduction current vs. elapsed time between the invention and an invention of the prior art, where the indicated value is stable in the invention, while it varies in the device of the prior art.

In the invention, since a water flow is induced parallel to the surface of a diaphragm at the bottom of an electrode by rotating a rotor provided at the lower end of the electrode, the distance between the diaphragm and the rotor is always kept constant, thereby easily establishing a uniform flow velocity and rendering the measurement of dissolved oxygen extremely constant. Bubbles adhering to the diaphragm can also be removed completely. The electrode itself is not equipped with a motor so that the electrode can be made compact, light-weight and free of failure. Since the cork for securing the electrode is slidable, it eliminates the necessity to select the size of a vessel.

Since it will be appreciated that the mode of carrying out the invention can be constructed in variety of ways without departing from the spirit and scope of the invention, the invention is not intended to be limited to the specific embodiments described except to those defined in the claims attached hereto.

What is claimed is:

1. A stirring device for automatically measuring dissolved oxygen, characterized in that it comprises an electrode, a rotor which is rotatively attached to one end of the electrode through a support and has N and S poles and a rotating shaft perpendicular to the lengthwise direction of the electrode, and a rotor driving means which is disposed adjacent to the rotor and so constructed that the N and S poles of the means alternately approach the rotor.

2. A stirring device as claimed in claim 1, wherein said rotor driving means comprises a U- or horseshoe-shaped magnet which is rotated about a vertical shaft.

3. A stirring device as claimed in claim 1, wherein said rotor driving means comprises a U- or horseshoe-shaped magnet which is rotated about a horizontal shaft.

* * * * *

UNITED STATES PATENT OFFICE
CERTIFICATE OF CORRECTION

Patent No. 4,665,736 Dated May 19, 1987

Inventor(s) Yokoyama et al

It is certified that error appears in the above-identified patent and that said Letters Patent are hereby corrected as shown below:

Please add the name of the second assignee as follows: Central Kagaku Co., Ltd., Tokyo, Japan

Signed and Sealed this

Sixth Day of October, 1987

*Attest:*

DONALD J. QUIGG

*Attesting Officer*

*Commissioner of Patents and Trademarks*